May 26, 1931.  J. G. SMEBY  1,807,446
VALVE
Filed April 19, 1927
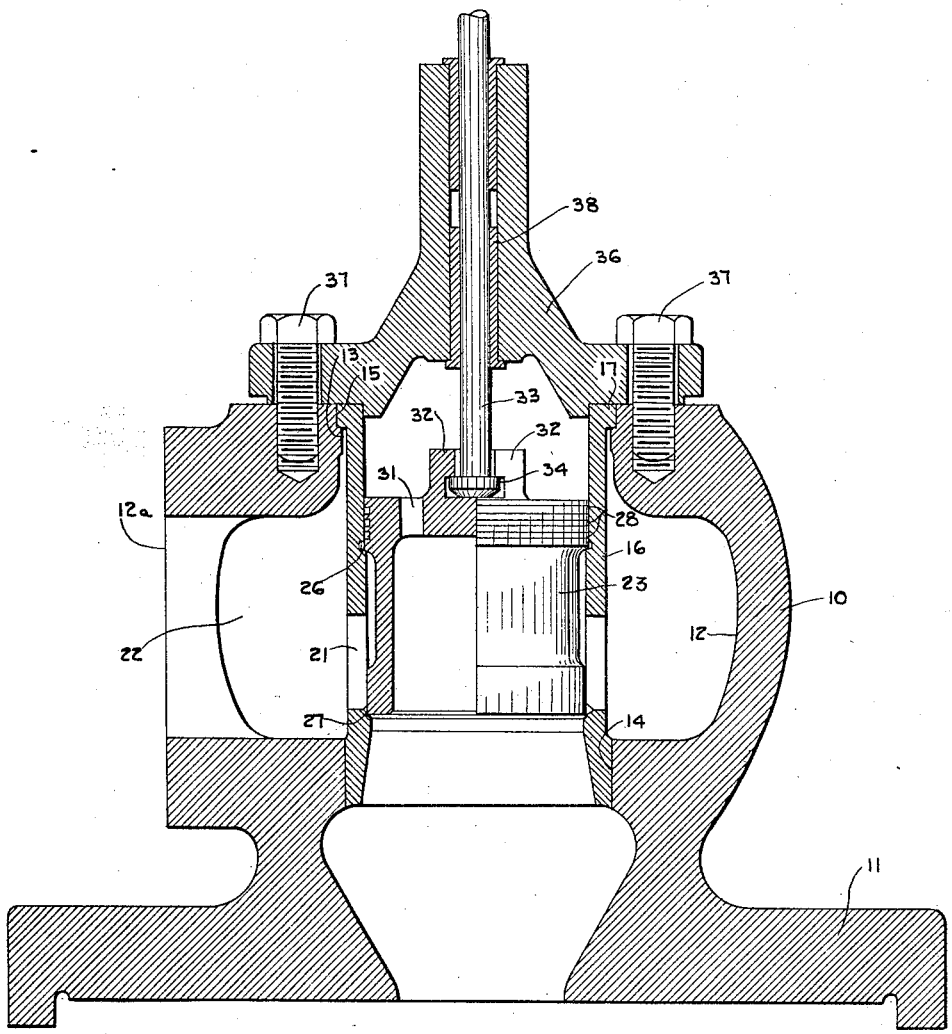
WITNESS
E. Lutz.
INVENTOR
J. G. Smeby
BY
A. B. Reavis
ATTORNEY Patented May 26, 1931

1,807,446

UNITED STATES PATENT OFFICE

JUSTIN G. SMEBY, OF MOORES, PENNSYLVANIA, ASSIGNOR TO WESTINGHOUSE ELECTRIC & MANUFACTURING COMPANY, A CORPORATION OF PENNSYLVANIA

VALVE

Application filed April 19, 1927. Serial No. 184,966.

My invention relates to valves for controlling the flow of fluid, and particularly to valves for controlling the admission of motive fluid to a steam engine, or the like.

An object of my invention is to provide a valve of the type described which shall be of simple and rugged construction, shall consist of few parts, and shall afford ease of manufacture and assembly.

Other and further objects of my invention will appear as the description proceeds.

A sectional view of a valve embodying features of my invention is shown in the figure in the accompanying drawing.

Balanced valves, as usually constructed, require a casting having a somewhat irregular interior structure, and interior surfaces which must be machined, and often these interior surfaces are difficult to finish without special tools. According to my invention, the housing of the valve may consist of a simple casting in which the only surfaces to be machined are aligned openings in opposite walls, and, in this way, the use of special tools, or other special equipment, is made unnecessary.

The necessary partitions and working surfaces for the interior of the housing are provided by a single bushing of simple construction, which may be completed before it is inserted into the housing. The valve may be of either the piston or seated type, and means may be provided for substantially equalizing pressure on different surfaces of the valve.

In the drawing, I show a housing 10, having a base 11, of any suitable form, as, for example, one to fit a steam chest, or the like. The interior walls 12 are substantially cylindrical, and are provided with an inlet 12a, and with opposite, aligned openings 13 and 14.

One of these openings, such as the opening 13, is preferably of larger diameter than the other, and this opening 13 may have a counterbored portion, such as shown at 15. The openings, 13, 14 and 15 are preferably axially aligned and in concentric relation with respect to each other. It will readily be seen, therefore, that the openings 13 and 14 present surfaces which are sufficiently near to the exterior of the housing to be easily accessible for machining and inspection.

A cylindrical member, or bushing 16, has a flange 17 which is adapted to fit the counterbore 15 of the opening 13. The remainder of the peripheral surface of the bushing 16 is preferably of a smaller diameter than the opening 13. At the opposite end from the flange 17, the peripheral surface of the bushing 16 is machined to fit the opening 14.

Obviously the bushing may be fitted to the housing in any suitable manner, as by a pressed fit within the opening 14, and within the counterbore 15, leaving a sufficient clearance between opening 13 and the bushing to permit insertion of the latter. Likewise the bushing may be fitted to the opening 13 and a clearance provided between the flange 17 and the counterbore 15.

The walls of the bushing are provided with openings, or ports, 21, for affording communication between the steam inlet chamber 22 and the interior of the bushing.

A piston 23 of sufficient length to close the ports 21 is provided, and this piston may either take the form of a seated valve having seats provided for the opposite ends of the piston at 26 and 27, or either one, or both, of these seats may be omitted. In the latter case, the valve would function as an ordinary piston valve. If desired, suitable rings 28 may be provided at the upper end of the piston.

The means for equalizing the pressures on the various surfaces of the piston take the form of one, or more passages 31 through the end of the piston.

Means may be provided on an end of the piston 23, here shown as the upper end, for connecting the piston to an actuating means. In the form shown, lugs 32 are provided so as to form a T-shaped slot with the head of the piston, and a valve stem 33, having an enlarged head 34, is inserted in this slot.

A cover 36 is secured to the housing in any suitable manner, as by bolts 37, and it is provided with a bushed opening 38, to receive the valve stem, and to keep the stem properly aligned and to prevent the same from working out of the T-shaped slot.

It will, therefore, be apparent that the component parts of the valve may be readily and easily manufactured and assembled, for the bushing 16 is either threaded or pressed into the housing in completed form, and it is then merely necessary to insert the piston and secure the cover 36 to the housing. Also, the parts which are relatively movable upon one another, namely, the bushing and the piston, may be readily replaced should they become worn.

While I have shown my invention in one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

In a device for controlling the flow of fluid, the combination of a housing provided with a chamber having inlet and outlet passages; and means for controlling communication between the chamber and the outlet passage including a cylindrical opening adjacent to the chamber and at the inlet end of the outlet passage, a co-axial cylindrical opening of larger diameter than the first opening provided in the wall of said chamber opposite to the first opening, a cylindrical bushing having at its inner end a cylindrical outer surface arranged to fit said first-named opening with a driving fit, and having at its outer end a cylindrical enlargement arranged to fit said larger opening with a driving fit, said bushing having a cylindrical bore, said inlet passage being in communication with the chamber and the latter communicating with the outlet passage by ports provided in the bushing wall, a balanced valve fitting the bore of said bushing and arranged to cover and to uncover said ports, and means for closing the outer end of the bushing and provided with means for actuating said valve.

In testimony whereof, I have hereunto subscribed my name this eleventh day of April, 1927.

JUSTIN G. SMEBY.